US012591765B2

(12) United States Patent
Cheng et al.

(10) Patent No.: US 12,591,765 B2
(45) Date of Patent: Mar. 31, 2026

(54) SYSTEMS AND METHODS FOR BUILDING A CUSTOMIZED GENERATIVE ARTIFICIAL INTELLIGENT PLATFORM

(71) Applicant: Salesforce, Inc., San Francisco, CA (US)

(72) Inventors: Na (Claire) Cheng, Yarrow Point, WA (US); Jayesh Govindarajan, Palo Alto, CA (US); Zachary Alexander, Berkeley, CA (US); Shashank Harinath, Mountain View, CA (US); Atul Kshirsagar, San Ramon, CA (US); Fermin Ordaz, Livermore, CA (US)

(73) Assignee: Salesforce, Inc., San Francisco, CA (US)

( * ) Notice: Subject to any disclaimer, the term of this patent is extended or adjusted under 35 U.S.C. 154(b) by 155 days.

(21) Appl. No.: 18/496,523

(22) Filed: Oct. 27, 2023

(65) Prior Publication Data

US 2024/0303443 A1 Sep. 12, 2024

Related U.S. Application Data

(60) Provisional application No. 63/507,404, filed on Jun. 9, 2023, provisional application No. 63/488,941, filed on Mar. 7, 2023.

(51) Int. Cl.
| | |
|---|---|
| *G06F 40/40* | (2020.01) |
| *G06F 16/334* | (2025.01) |
| *G06F 40/295* | (2020.01) |
| *G06N 3/0475* | (2023.01) |

(52) U.S. Cl.
CPC ....... *G06N 3/0475* (2023.01); *G06F 16/3347* (2019.01); *G06F 40/295* (2020.01); *G06F 40/40* (2020.01)

(58) Field of Classification Search
USPC ................................................. 704/7–10, 257
See application file for complete search history.

(56) References Cited

U.S. PATENT DOCUMENTS

| | | | | |
|---|---|---|---|---|
| 2023/0237277 A1* | 7/2023 | Reza | ...................... | G06F 40/186 |
| | | | | 704/9 |
| 2024/0289545 A1* | 8/2024 | Miller | ...................... | G06F 40/20 |
| 2024/0303443 A1* | 9/2024 | Cheng | .................. | G06N 3/0475 |
| | (Continued) | | | |

OTHER PUBLICATIONS

International Search Report and Written Opinion for PCT/US2024/032632, dated Oct. 10, 2024, 18 pages.

(Continued)

*Primary Examiner* — Leonard Saint-Cyr
(74) *Attorney, Agent, or Firm* — Haynes and Boone, LLP

(57) ABSTRACT

Embodiments provide a generative AI creation framework to a customized generative AI stack using a foundational model (such as GPT) based on user-defined prompts, a natural language description of the task to be accomplished, and domain adaptation. In one embodiment, organization-specific knowledge may be injected into either the prompt and/or the foundational model. In this way, the customized generative AI stack thus supports a full spectrum of domain-adaptive prompts to enable a full spectrum of personalized and adaptive AI chat applications.

15 Claims, 12 Drawing Sheets

(56) References Cited

U.S. PATENT DOCUMENTS

| | | | | |
|---|---|---|---|---|
| 2024/0362937 A1* | 10/2024 | Malviya | ................. | G06V 30/16 |
| 2024/0419702 A1* | 12/2024 | Adaboina | ............. | G16H 40/20 |

OTHER PUBLICATIONS

Shen et al., "HuggingGPT: Solving AI Tasks with ChatGPT and its Friends in HuggingFace", Arxiv.org, Cornell University Library, 201 Olin Library Cornell University, Ithaca, NY 14853, Mar. 30, 2023, XP091472266, 18 pages.

* cited by examiner

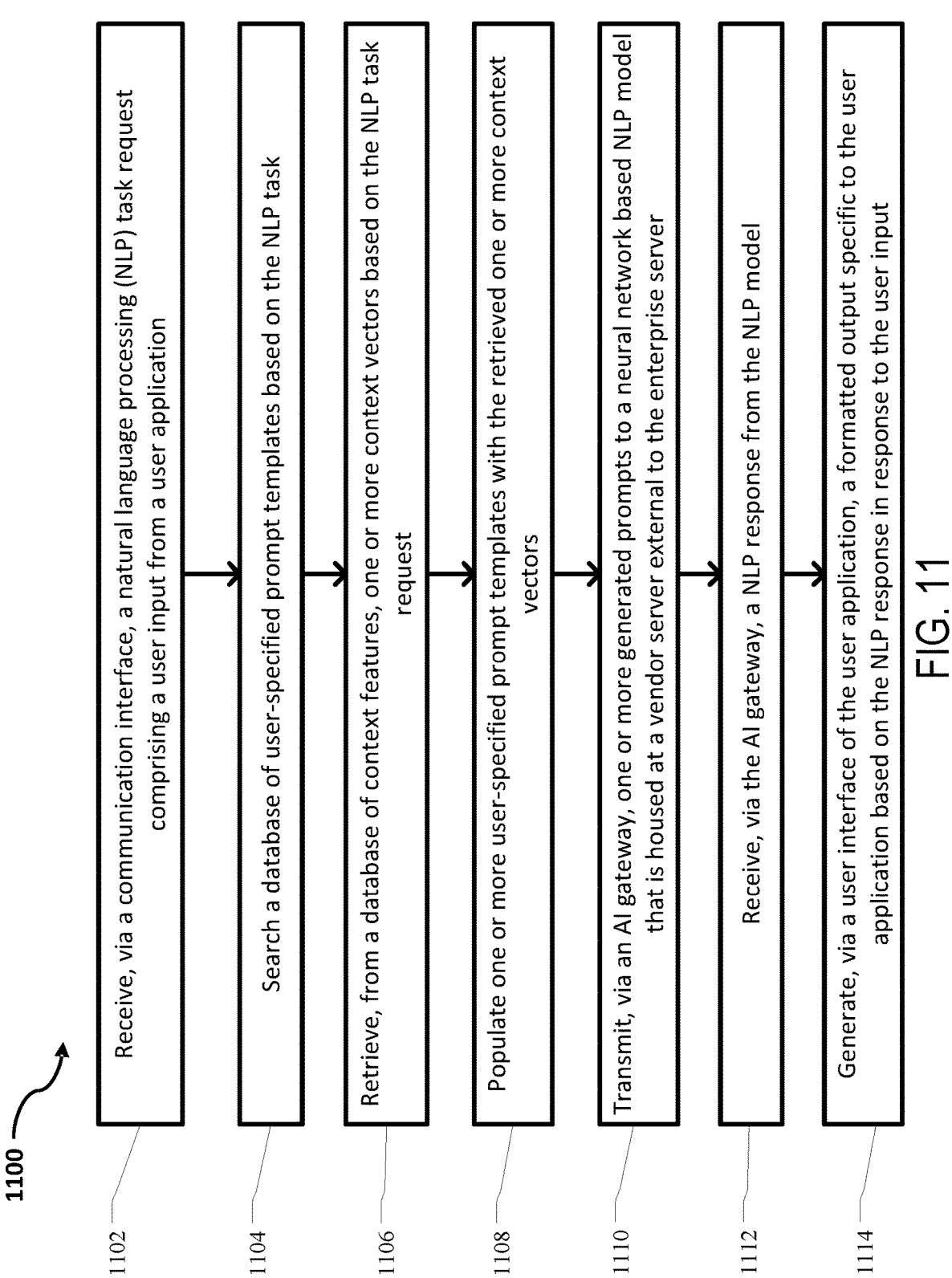

1100

1102 — Receive, via a communication interface, a natural language processing (NLP) task request comprising a user input from a user application 1104 — Search a database of user-specified prompt templates based on the NLP task 1106 — Retrieve, from a database of context features, one or more context vectors based on the NLP task request 1108 — Populate one or more user-specified prompt templates with the retrieved one or more context vectors 1110 — Transmit, via an AI gateway, one or more generated prompts to a neural network based NLP model that is housed at a vendor server external to the enterprise server 1112 — Receive, via the AI gateway, a NLP response from the NLP model 1114 — Generate, via a user interface of the user application, a formatted output specific to the user application based on the NLP response in response to the user input

FIG. 11

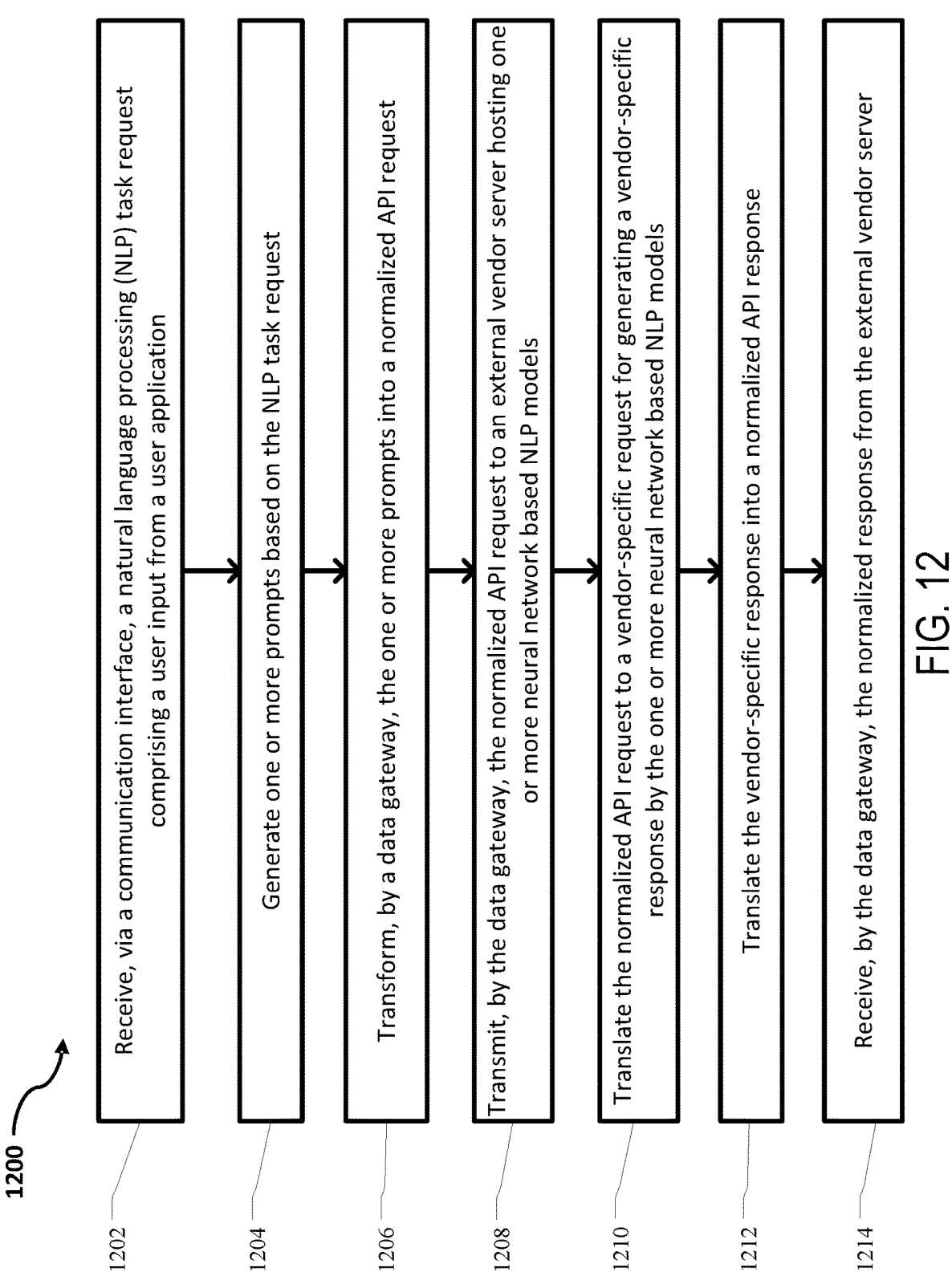

1202 Receive, via a communication interface, a natural language processing (NLP) task request comprising a user input from a user application 1204 Generate one or more prompts based on the NLP task request 1206 Transform, by a data gateway, the one or more prompts into a normalized API request 1208 Transmit, by the data gateway, the normalized API request to an external vendor server hosting one or more neural network based NLP models 1210 Translate the normalized API request to a vendor-specific request for generating a vendor-specific response by the one or more neural network based NLP models 1212 Translate the vendor-specific response into a normalized API response 1214 Receive, by the data gateway, the normalized response from the external vendor server

SYSTEMS AND METHODS FOR BUILDING A CUSTOMIZED GENERATIVE ARTIFICIAL INTELLIGENT PLATFORM

CROSS REFERENCE(S)

The instant application is a nonprovisional of and claims priority under 35 U.S.C. 119 to U.S. provisional application Nos. 63/488,941, filed Mar. 7, 2023 and 63/507,404, filed Jun. 9, 2023.

The instant application is related to U.S. nonprovisional application Ser. No. 18/496,513, filed on Oct. 27, 2023.

The aforementioned applications are hereby expressly incorporated by reference herein in their entirety.

TECHNICAL FIELD

The embodiments relate generally to machine learning systems for neural networks and deep learning models, and more specifically to systems and methods for building a customized generative artificial intelligent (AI) platform.

BACKGROUND

Machine learning systems have been widely used in building automatic chatbots, such as customer service, online training or teaching, and/or the like. For example, an enterprise server such as a bank, a hospital, and/or the like, may be deployed with a deep learning model for automated customer service, technical support, and/or the like. However, training and deploying a neural network model may be costly and time consuming.

BRIEF DESCRIPTION OF THE DRAWINGS

FIG. 11 is an example logic flow diagram illustrating a method of building a customized generative artificial intelligence (AI) infrastructure at an enterprise server shown in FIGS. 1-10, according to some embodiments described herein.

FIG. 12 is an example logic flow diagram illustrating a method of operating an AI gateway to connect to vendor-specific LLMs shown in FIGS. 1-10, according to some embodiments described herein.

Figure 1:
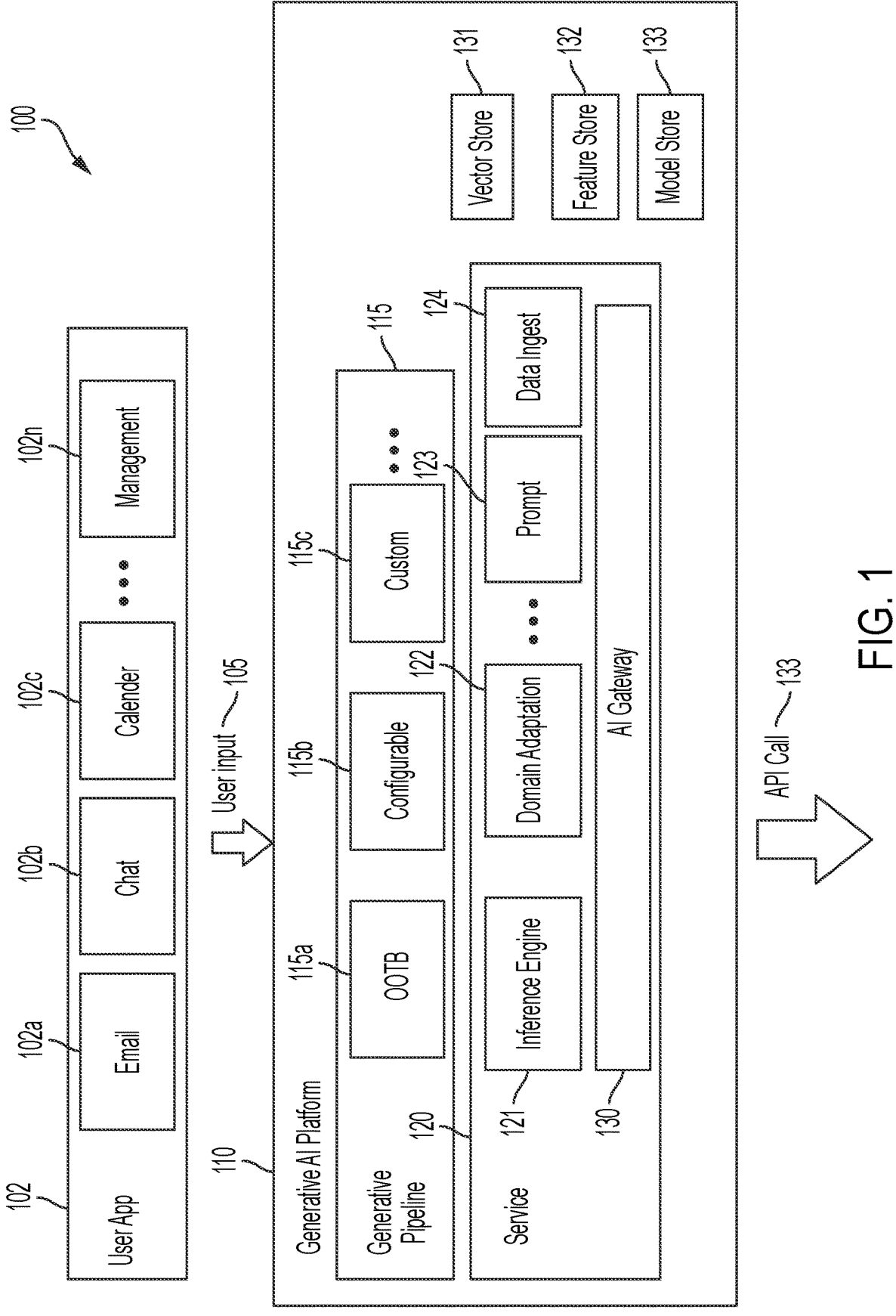
FIG. 1 is a simplified diagram illustrating a customized generative artificial intelligence (AI) stack deployed at an enterprise server, according to some embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters.

Overview

Generative natural language processing (NLP) systems such as GPT-3.0, GPT-4.0 by OpenAI, or foundation models offered by Cohere have shown tremendous potential. Specifically, Large Language Models (LLMs) have shown improved performance in specific tasks like summarization, named entity recognition, or translation compared to existing NLP systems. However, such LLM models have also shown various limitations including limited factual correctness, inclination to biases, etc. In other words, the performance of existing generative NLP systems are often limited by the limits by the knowledge contained in their training data resources.

Embodiments described herein provide a generative AI creation framework to a customized generative AI stack using a foundational model (such as GPT) based on user-defined prompts, a natural language description of the task to be accomplished, and domain adaptation. In one embodiment, organization-specific knowledge may be injected into either the prompt and/or the foundational model. In this way, the customized generative AI stack thus supports a full spectrum of domain-adaptive prompts to enable a full spectrum of personalized and adaptive AI chat applications.

For example, the generative AI creation framework may utilize commercially available AI services and/or LLMs, provided by vendors such as OpenAI, Cohere, NVidia, Hugging face, and/or the like. Such AI models may be located outside of the enterprise server, such that the enterprise server may communicate with the external generative AI models via a network. Alternatively, to preserve data privacy, a copy of vendor provided LLMs may be implemented at the enterprise server. A generative AI gateway that serve as a generic API to different LLMs may be deployed to connect to different generative AI models and/or services.

For another example, customer relationship management (tenant) data may be incorporated into a generative AI chat platform to provide customized experience for a customer in business analytics. Specifically, the generative AI creation stack comprise an interface with normalized APIs as an alternative to custom integrations with internal and externally hosted foundational models such as LLMs. Domain adaptation may be implemented through data ingestion, model tuning, content indexing, and a retrieval pipeline. A library of prompt templates and example common use cases and sub-tasks may be provided through the interface. Generic API interfaces and Rest API may be used to directly interface with the generative services and/or LLM Gateway.

In one embodiment, some prompts contain examples of the job to be done, while others rely on step-by-step instructions. For example, static prompts remain the same across multiple LLM invocations, whereas dynamic prompts are generated by combining data and instructions on demand-effectively grounding an LLM with customer data and domain-specific knowledge. Grounding data may be derived from the current context, SOQL queries, and/or semantic retrieval of tenant objects. Some prompts are optimized for a specific vendor's LLM, while others may require a custom-tuned LLM optimized for a particular data source or task.

Embodiments described herein provide a data interface that connects an LLM at a data vendor server and various applications at an enterprise server. In one embodiment, the data interface may take a form as an application programing interface (API) installed at the enterprise server. The data interface may perform vendor specific authorization procedure when invoking appropriate vendor APIs and thus routing a request to a relevant vendor that hosts the appropriate LLM. In this way, the data interface provides a normalized request/response communication mechanism across different vendors when different LLMs may be called upon by the enterprise server.

In this way, the generative AI creation stack may allow the creation of a flexible generative chat platform that allows the consumer to not only design the application, but also to design the generative capability that powers the application, e.g., by injecting tenant data for training, and/or the like.

FIG. 1 is a simplified diagram illustrating a customized generative AI stack 100 deployed at an enterprise server, according to some embodiments described herein. The customized generative AI stack 100 may be built on a generative AI platform 110.

In one embodiment, the generative AI platform 110 may comprise a service layer 120 that interactively operate with one or more stores 131-133, on top of which one or more generative pipelines 115 may be built and maintained. The service layer 120 may comprise an AI gateway 130 to communicatively connect to any generative AI model (e.g., in-house built models or models from external servers such as commercialized LLMs). The AI gateway 130 may allow generative AI features to be compatible among different AI models with the generative AI platform 110. For example, the generative AI gateway 130 may comprise a Spring boot based web application that exposes normalized APIs to interact with AI models provided by different vendors, both in-house built models or models from external servers such as commercialized LLMs. Additional structural and/or functional details of AI gateway 130 may be provided below in relation to FIGS. 5-6.

In one embodiment, the service layer 120 further comprise an inference engine 121 that conducts AI service at an inference stage, e.g., to execute a received task request. For example, the generative AI platform 110 may provide an AI agent conducting a conversation with a user for customer service, IT support, and/or the like, the inference engine 121 may then receive a user utterance via the AI agent and process the user utterance as an NLP task, e.g., question answering, document retrieval (to retrieve a support document to trouble shoot an IT issue, etc.), and/or the like.

In one embodiment, the service layer 120 further comprise a domain adaptation module 122 that provides domain adaptation during inference to serve the generative functions. For example, both an internally deployed model and/or an external LLM may learn from, adapt to, and explicitly utilize enterprise data in training or finetuning, e.g., by either injecting additional domain knowledge into the prompt (Grounding), or into the LLM itself (model tuning). Additional domain adaptation details may be found in FIGS. 7A-7B.

In one embodiment, the service layer 120 further comprise a prompt module 123 that creates and/or stores a plurality of prompts for different tasks.

In one embodiment, the service layer 120 further comprise a data ingestion module 124 that supports data ingestion pipelines to pull, transform and store customized data (e.g., tenant data of tenants of the generative AI platform 110). The data ingestion module 124 may integrate with various data sources including internal databases and/or any data cloud that is located remotely (e.g., data vendor servers 1045, 1070 and 1080 in FIG. 10), and provides domain adaptation during inference to serve the generative functions.

In one embodiment, the service layer 120 may add higher level abstraction on top of base foundational services 121-124, providing generative pipelines 115. For example, the inference engine 121 may provide a plurality of generative pipelines 115. Each generative pipeline may take a form as a sequence of reusable generative steps stitched together to accomplish a generative task, e.g., generating an answer to an input question, a summary to an input text, and/or the like. In one implementation, the sequence of reusable generative steps may include a data pull job, a connector to one or more data sources, a content retriever to look up and retrieve features and/or vectors from the vector store 131 and/or feature store 132, a prompt store for storing and retrieving versioned prompt templates, and a prompt completion step to fill prompt template slots given retrieved context, and/or the like. The generative steps may be reused and/or customized to compose new custom pipelines for new use cases.

In one embodiment, the generative pipelines 115 may be shared by multiple applications and/or features. Different generative pipelines (e.g., 115a-c) may be parameterized by using the same prompt templates, but may populate the same prompt templates with different content. The generative pipelines 115 are also extensible to add new modular steps with new LLM vendors, app-specific transformations, and/ or the like. T In one embodiment, the generative pipelines 115 may comprise an out-of-box (OOTB) generative pipeline 115a (as further illustrated in FIG. 2), a configurable generative pipeline 115b (as further illustrated in FIG. 3), and easy-toassemble building blocks to construct custom generative pipeline 115c (as further illustrated in FIG. 4).

In one embodiment, the generative AI platform 110 may host several stores in one or more memory units (e.g., see 820 in FIG. 8), such as a vector store 131 that stores previously indexed sparse vectors, and/or dense vectors relating to content and/or knowledge entity fields, a feature store 132 that stores previously transformed and indexed entity data, a model store 133 that stores customized embeddings for each available LLM, and/or the like.

In one embodiment, the customized generative AI stack 100 may comprise user-front service such as a plurality of user applications 102, including but not limited to AI-assisted email service 102a, an AI-chat application 102b, an AI-assisted calendar application 102c, an AI-assisted management function 102n, and/or the like. For example, a user may provide user input 105 and/or other inputs via one or more user interfaces associated with user applications 102a-n, to the generative AI platform 110, which may launch one or more generative pipelines 115 to generate a LLM prompt that incorporates and/or instructs a task to be completed. The LLM prompt may be sent out via the AI gateway 130 to one or more AI models, either local or remotely located, in the form of one or more API calls 133. In this way, various user applications 102a-n that are built on top of the generative services may provide an assistant-like experience with users.

In one embodiment, user input 105 may take a form of a text, an audio, video, image, code language, and/or the like. User input 105 may be converted to a vector representation at the generative AI platform 110, as shown below in FIG. 3. In one implementation, the AI gateway may select an LLM (e.g., 519a-n) based on a modality of user input 105. For example, when user input 105 comprise an image, AI gateway 130 may select GPT-4.0 at the vendor serve for generating a response as GPT-4.0 is capable of understanding image content.

Figure 2:
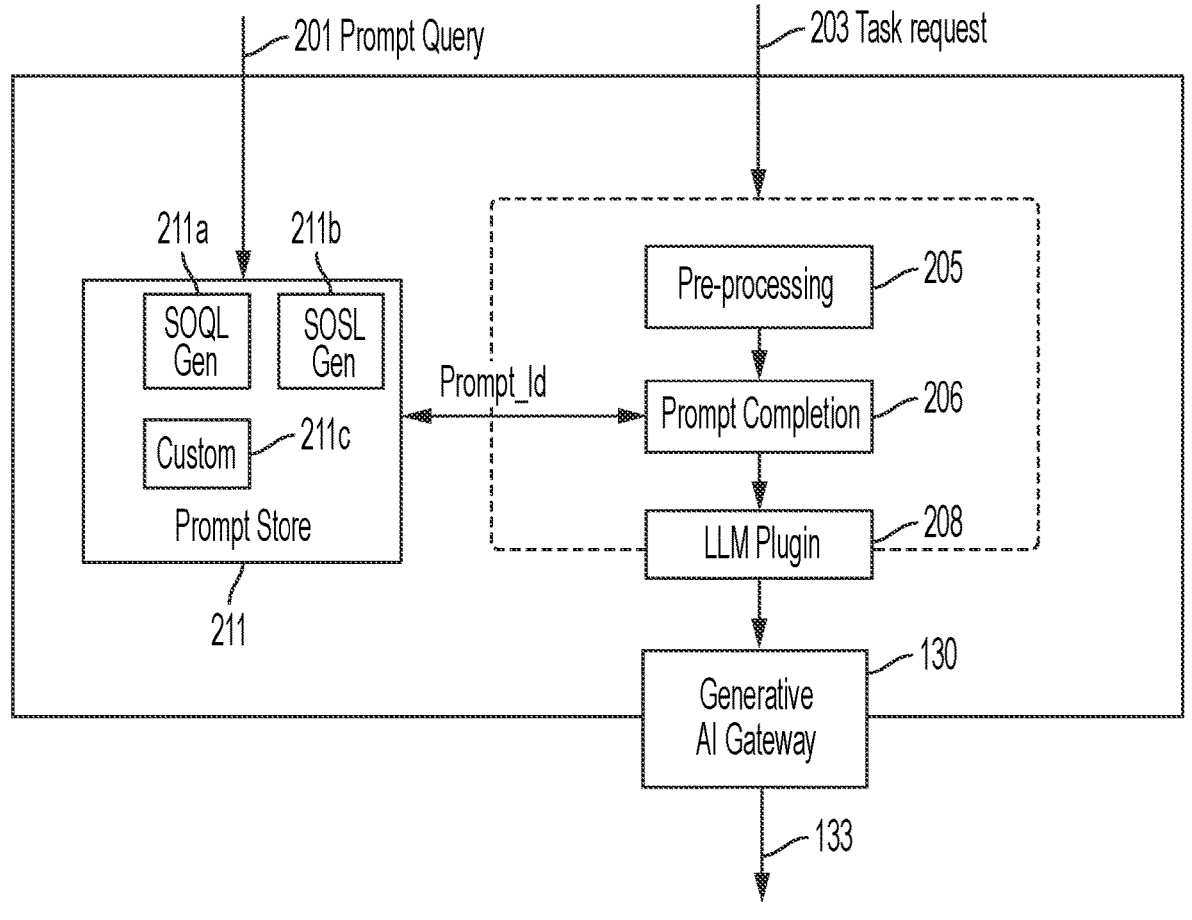
FIG. 2 is an example diagram illustrating an out of the box (OOTB) generation flow employed by the OOTB pipeline 115*a* in FIG. 1, according to embodiments described herein.

FIG. 2 is an example diagram illustrating an OOTB generation flow employed by the OOTB pipeline 115a in FIG. 1, according to embodiments described herein. The OOTB generation flow may comprise building a prompt and then generating a text response in response to a specific task request 203.

In one embodiment, a task request 203 may be received at the generation pipeline (e.g., 115a in FIG. 1), e.g., a request to generate a response to an email from email app 102, a request to generate a response to a user utterance from chat application 102c, and/or the like. The task request 203 may be received in the form of an incoming API request, and the pre-processing module 205 may process the incoming API payload. For example, the preprocessing module 205 may parse the content from the API task request 203 and call a prompt generation step, e.g., the prompt completion module 206, etc.

In one embodiment, a prompt corresponding to the task request 203 may be provided as input (e.g., part of task request 203, etc.) or generated based on a prompt query 201. For example, the prompt query 201 may be generated based on the type of user application that originates the task request 203, based on which prompt templates may be retrieved from the prompt store 211. For example, the prompt store 211 may store prompt templates to generate SOQL, short summaries, SOSL, Apex and any different custom formats that can go into an LLM prompt. These flows 211a-c are accessed via APIs and don't require any previously indexed data.

The prompt completion module 206 may in turn combine the retrieved prompt template with dynamic input data (e.g., from payload of the AI task request 203) to produce fully defined prompts. The generated prompt for LLM may then be passed to an LLM plugin 208, which directs the prompt to the generative AI gateway 130.

Figure 3:
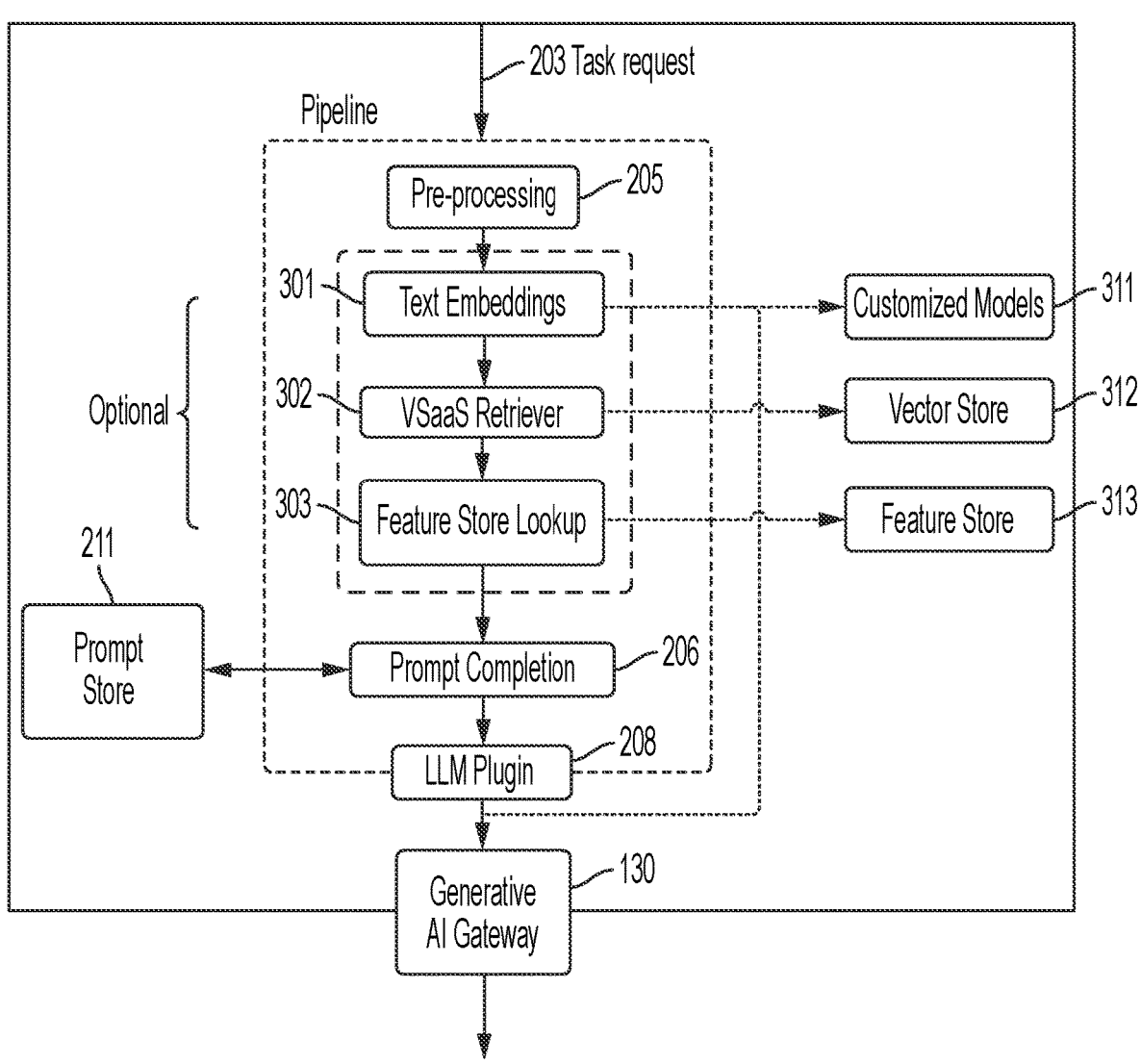
FIG. 3 is an example diagram illustrating a configurable context-grounded generation flow employed by the configurable pipeline in FIG. 1, according to embodiments described herein.

FIG. 3 is an example diagram illustrating a configurable context-grounded generation flow employed by the configurable pipeline 115b in FIG. 1, according to embodiments described herein. In one embodiment, similar as the OOTB generation flow, after the task request 203 has been processed and parsed for payload by pre-processing module 205, additional content may be retrieved to augment the payload in the task request 203 in order for the prompt completion module 206 to generate a prompt for an LLM.

In one embodiment, retrieval steps 301-303 may be performed to retrieve previously stored context information to control the output of a language model. Context information may be previously generated and stored offline, e.g., by data ingestion of enterprise data, context indexing and retrieval. For example, text embeddings 301 may be retrieved from previously generated text embeddings (e.g., content and knowledge entity fields, etc.) of domain data such as enterprise data by various custom models 311. A VSaaS retriever 302 may retrieve vectors of knowledge entity fields from a vector store 312, e.g., sparse vectors retrieval based on BM25/TF-IDF techniques, dense vectors retrieved through dense vector search (AkNN) for transformer based models or LLM, and/or the like. A feature store lookup 303 may further retrieve previously stored features of related knowledge entity fields from a feature store 313.

One or more of the retrieval steps 301-303 may be performed concurrently, alternately, sequentially or in any different combination or order. In one embodiment, retrieved embeddings, vectors and/or features may be combined using respective weights and the weighted combination may be passed to the prompt completion 206 to fill a retrieved prompt template.

In one embodiment, the prompt completion 206 may generate a prompt for task request 203 combining a set of user-specified prompts (e.g., parsed from payload of task request 203) which serve as a starting point for text generation, and a set of constraints (e.g., retrieved content from 311-313) for the generative language model to follow. In this way, the retrieval steps 301-303 may find relevant data that the language model may use to generate contextualized and semantically meaningful output. By combining prompting and retrieval, the configurable context-grounded generative pipeline 115b may generate more accurate, controlled text generation with LLMs.

For example, for applications such as knowledge summarization, email and dialogue generation, the configurable context-grounded generative pipeline 115b may utilize retrieved context information to ground the LLM to generate relevant information in the output summary, email and/or dialogue responses.

Figure 4:
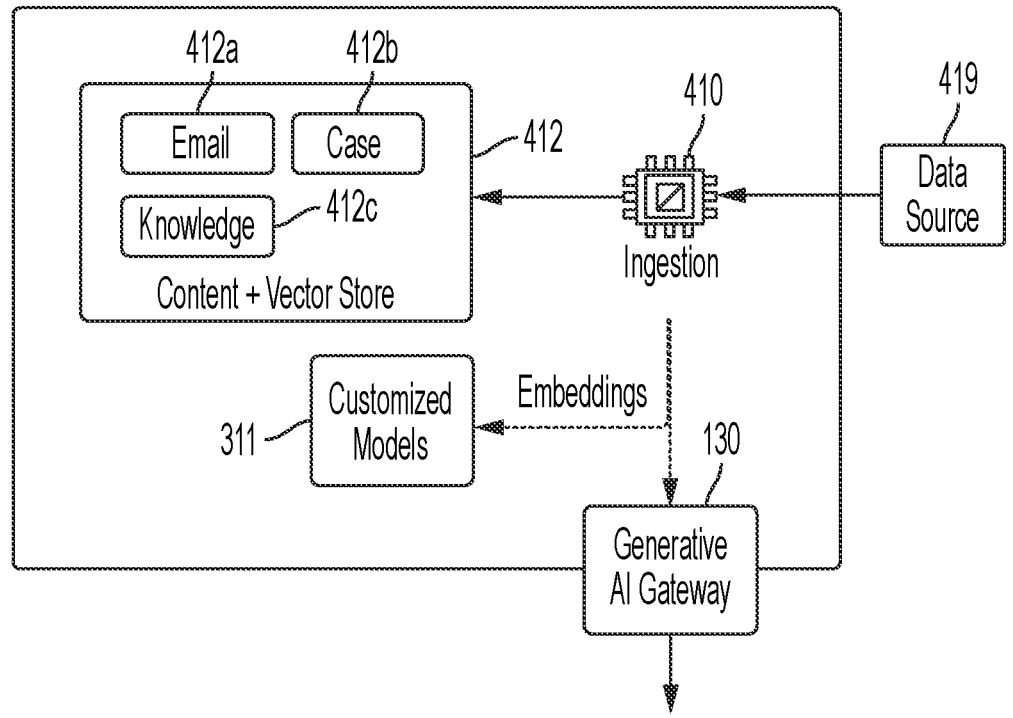
FIG. 4 is an example diagram illustrating a custom generation flow employed by the custom pipeline in FIG. 1, according to embodiments described herein.

FIG. 4 is an example diagram illustrating a custom generation flow employed by the custom pipeline 115c in FIG. 1, according to embodiments described herein. When the existing OOTB generative flow shown in FIG. 2 may not fit a given use case, a custom generative pipeline 115c may be created by modifying existing pipelines and adding generative steps, implementing brand new steps encapsulating any use case specific logic, and so forth. In this way, these new custom flows can be as similar to existing flows or as different as needed.

In one embodiment, for tasks that call for domain adaptation, a data ingestion pipeline 410 may be used to pull, transform and store tenant data from internal and/or external data sources 419. For example, tenant data from data source 419 may be indexed and ingested periodically, constantly, intermittently, and/or on demand in real time in response to a task request that entails building a custom generative pipeline.

Tenant data may be transformed into vectors by calling models hosted internally on or to external vendors using LLM gateway 130. For example, transformed tenant data may be stored in vector form at the vector store 412 such that the vector data may be searched and retrieved via AkNN, VSaaS, and/or the like. The vector store 412 may store context vectors providing context information for email 412a, case 412b, knowledge 412c, and/or the like.

In one embodiment, upon ingesting data from the data source 419, embedding vectors relating to the task request may be retrieved from vector store 412, and sent to a (local) customized model 311 and/or an AI gateway 130.

Figure 5:
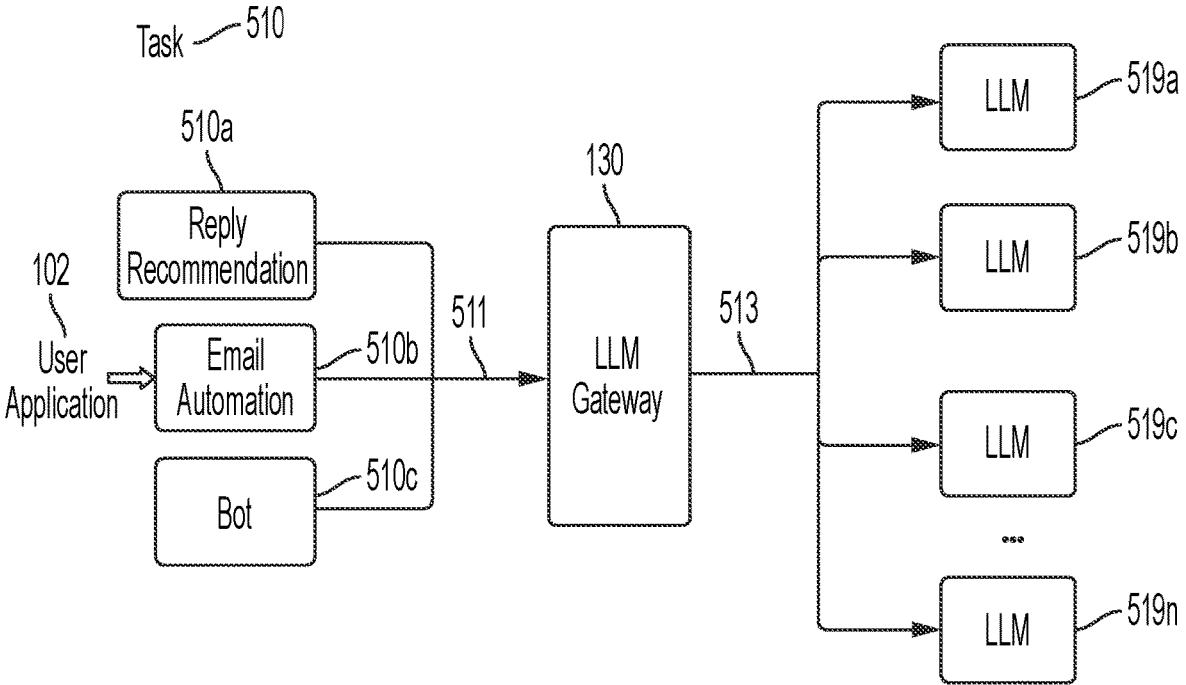
FIG. 5 is an example diagram illustrating an operation of AI gateway shown in FIG. 1, according to embodiments described herein.

FIG. 5 is an example diagram illustrating an operation of AI gateway 130 shown in FIG. 1, according to embodiments described herein. In one embodiment, the LLM gateway 130 may provide a standard interface to interact with different LLMs 519a-n located on different external servers. The LLM gateway 130 may comprise an API layer that exposes a normalized API to switch to using any LLM vendor that supports text completion/generation, generating embeddings, and finetuning a model.

In one embodiment, the AI gateway 130 may receive a task request 511 from different user applications 102 to perform a task 510, such as a reply recommendation 510a, an email automation 510b, a bot task 510c, and/or the like, and connect the task request with an external LLM 519a-n. Specifically, the AI gateway 130 may specify a parameter in the request 513 to identify a target LLM, and perform vendor specific AuthN/AuthZ when invoking appropriate vendor APIs for the target LLM.

In one embodiment, the LLM gateway 130 may be implemented as a Spring boot based web application that exposes normalized APIs to interact with LLM models 519a-n provided by different vendors. The LLM gateway 130 may use spring integration to route the request 513 to appropriate provider using a HeaderValueRouter. Each LLM provider 519a-n, upon receiving the request 513, may handle provider specific logic to convert the request payload from request 513 from a normalized format to vendor payload and using provider specific authentication mechanism.

Figure 6:
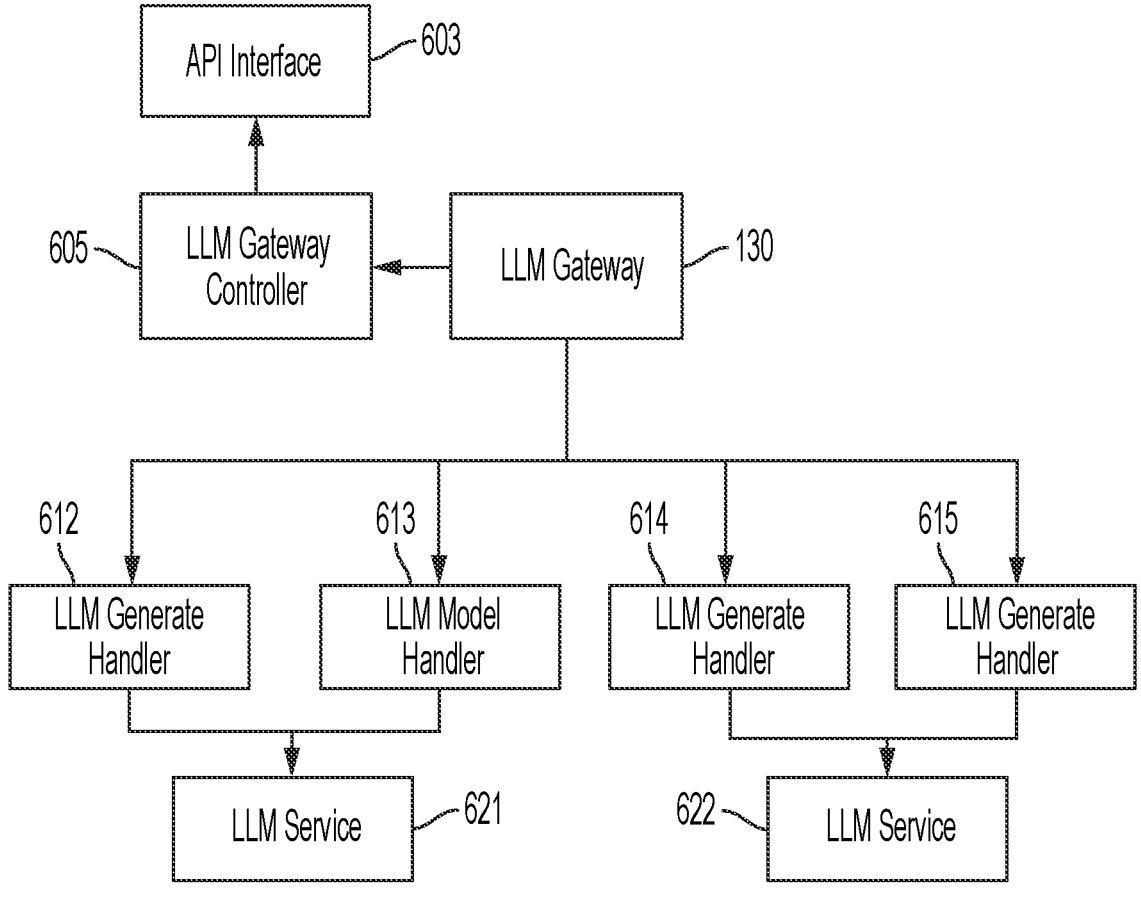
FIG. 6 is an example diagram illustrating a high-level class work flow of LLM gateway in FIG. 5, according to embodiments described herein.

FIG. 6 is an example diagram illustrating a high-level class work flow of LLM gateway 130 in FIG. 5, according to embodiments described herein. In one embodiment, an API interface 603, triggered by a task request, may invoke the LLM gateway controller 605 that calls upon LLM gateway 130. LLM gateway 130 may in turn invoke an LLM generate handler 612, 614 to generate a post message (e.g., API call 133 in FIG. 1) for LLM service 621, 622 to generate a response based on the provided prompt and parameters. Example pseudo-code segment for the post message may take a form similar to the following:

```
post:
summary: "Generates a response based on the provided prompt and parameters"
description: "Generates a response based on the provided prompt and parameters"
operationId: "generate"
security:
- bearerAuth: [ ]
parameters:
- in: "header"
name: "X-Org-Id"
description: "Salesforce Org id for the request"
example: "00Dx0000000ALskEAG"
required: true
schema:
type: "string"
allowEmptyValue: false
- in: "header"
name: "X-LLM-Provider"
description: "Provider to be used. Should be one of OpenAI|Cohere"
example: "OpenAI"
required: true
schema:
type: "string"
enum: [ "OpenAI", "Cohere" ]
allowEmptyValue: false
requestBody:
required: true
content:
application/json:
schema:
$ref: '#/components/schemas/GenerationRequest'
```

In one embodiment, an example pseudo-code segment for the schema of a generation request may take a form similar to the following:

```
GenerationRequest:
type: object
properties:
prompt:
description: "Represents the prompt or text to be completed."
type: "string"
```

-continued

```
num_generations:
description: "Number of completions to be generated for this prompt"
type: integer
default: 1
max_tokens:
description: "Maximum number of tokens to be generated"
type: integer
default: 16
temperature:
description: "Sampling temperature to be used. Higher values means the model
type: number
default: 0.5
stop_sequences:
description: "The generated text will be cut at the end of the earliest occur
type: "array"
items:
type: "string"
frequency_penalty:
description: "Defaults to 0.0, min value of 0.0, max value of 1.0. Can be us
type: number
default: 0.0
presence_penalty:
description: "Defaults to 0.0, min value of 0.0, max value of 1.0. Can be us
type: number
default: 0.0
parameters:
description: "Dictionary of any other parameters that are required by the sp
type: object
example: { 'top_p': 0.5, 'logProbs': 3, 'echo': false }
required:
- "prompt"
```

In one embodiment, an example pseudo-code segment for the schema of a generation response may take a form similar to the following:

```
GenerationResponseGenerations:
type: "object"
description: "generated text"
properties:
text:
description: "Text"
type: "string"
parameters:
type: object
description: "Any provider specific attributes will be included as part of t
example: { "finish_reason": "stop", "index": 0, "logprobs": null }
required:
- "text"
GenerationResponse:
type: "object"
properties:
id:
description: "ID of the generation request"
type: "string"
generations:
description: "List of generated text"
type: "array"
items:
$ref: "#/components/schemas/GenerationResponseGenerations"
prompt:
type: string
description: "Prompt used for the generation"
parameters:
type: object
description: "Any provider specific attributes will be included as part of t
example: { "model": "text-davinci-003", "object": "text_completion", "usage":
required:
- "id"
- "generations"
```

In one embodiment, the LLM generate handler 612, 614 may optionally create an embedding vector representing the input text. An example pseudo-code segment for creating an embedding vector may take a form similar to the following:

```
post:
summary: "Creates an embedding vector representing the input text."
description: "Creates an embedding vector representing the input text."
operationId: "embeddings"
security:
- bearerAuth: [ ]
parameters:
- in: "header"
name: "X-Org-Id"
description: "Salesforce Org id for the request"
example: "00Dx0000000ALskEAG"
required: true
schema:
type: "string"
allowEmptyValue: false
- in: "header"
name: "X-LLM-Provider"
description: "Provider to be used. Should be one of OpenAI|Cohere"
example: "OpenAI"
required: true
schema:
type: "string"
enum: [ "OpenAI", "Cohere" ]
allowEmptyValue: false
requestBody:
required: true
content:
application/json:
schema:
$ref: '#/components/schemas/EmbeddingRequest'
```

An example pseudo-code segment for a schema of the embedding request may take a form similar to the following:

```
EmbeddingRequest:
type: object
properties:
input:
description: "Input texts to get embeddings for, encoded as an array of stri
type: "array"
items:
type: string
parameters:
description: "Dictionary of any other parameters that are required by the sp
type: object
example: { 'model': 'text-embedding-ada-002' }
required:
- "input"
Embeddings:
type: "object"
description: "Embedding of the text"
properties:
embedding:
description: "Embedding of the text"
type: "array"
items:
type: number
index:
type: integer
description: "Index of the input text to which this embedding belongs"
```

In one embodiment, LLM model handler 613, 615 may be invoked to return a list of models for a given provider. An example pseudo-code segment for a get message to return a list of models from a vendor server may take a form similar to the following:

```
get:
summary: "Returns list of models for a given provider"
description: "Returns list of models for a given provider"
operationId: "models"
security:
- bearerAuth: [ ]
parameters:
- in: "header"
name: "X-Org-Id"
description: "Salesforce Org id for the request"
example: "00Dx0000000ALskEAG"
required: true
schema:
type: "string"
allowEmptyValue: false
- in: "header"
name: "X-LLM-Provider"
description: "Provider to be used. Should be one of OpenAI|Cohere"
example: "OpenAI"
required: true
schema:
type: "string"
enum: [ "OpenAI", "Cohere" ]
allowEmptyValue: false
```

An example pseudo-code segment for a schema of a model response from a vendor server may take a form similar to the following:

```
ModelsResponse:
type: "array"
description: "List of Models for the specified provider"
items:
$ref: "#/components/schemas/ModelResponse"
ModelResponse:
type: "object"
description: "Model properties'
properties:
id:
description: "ID of the model"
type: "string"
properties:
description: "Dictionary of properties for the model. Specific to each provi
type: "object"
example: { "permission": [ "allow_fine_tuning": true ] }
required:
- "id"
```

Therefore, the API interface 603 may provide a normalized request/response payload across different LLM at different vendors. Translation to/from vendor request/response to the normalized request/response may be performed by respective provider implementation in LLM gateway 130. If provider specific properties (exposed through parameters in request and response) are not used then the application can remain agnostic to provider and interact with LLM gateway 130 and switch providers by just specifying the right provider in the request.

In one embodiment, for any specialized use cases an option to use provider specific request/response parameter is provided.

Figures 7A, 7B:
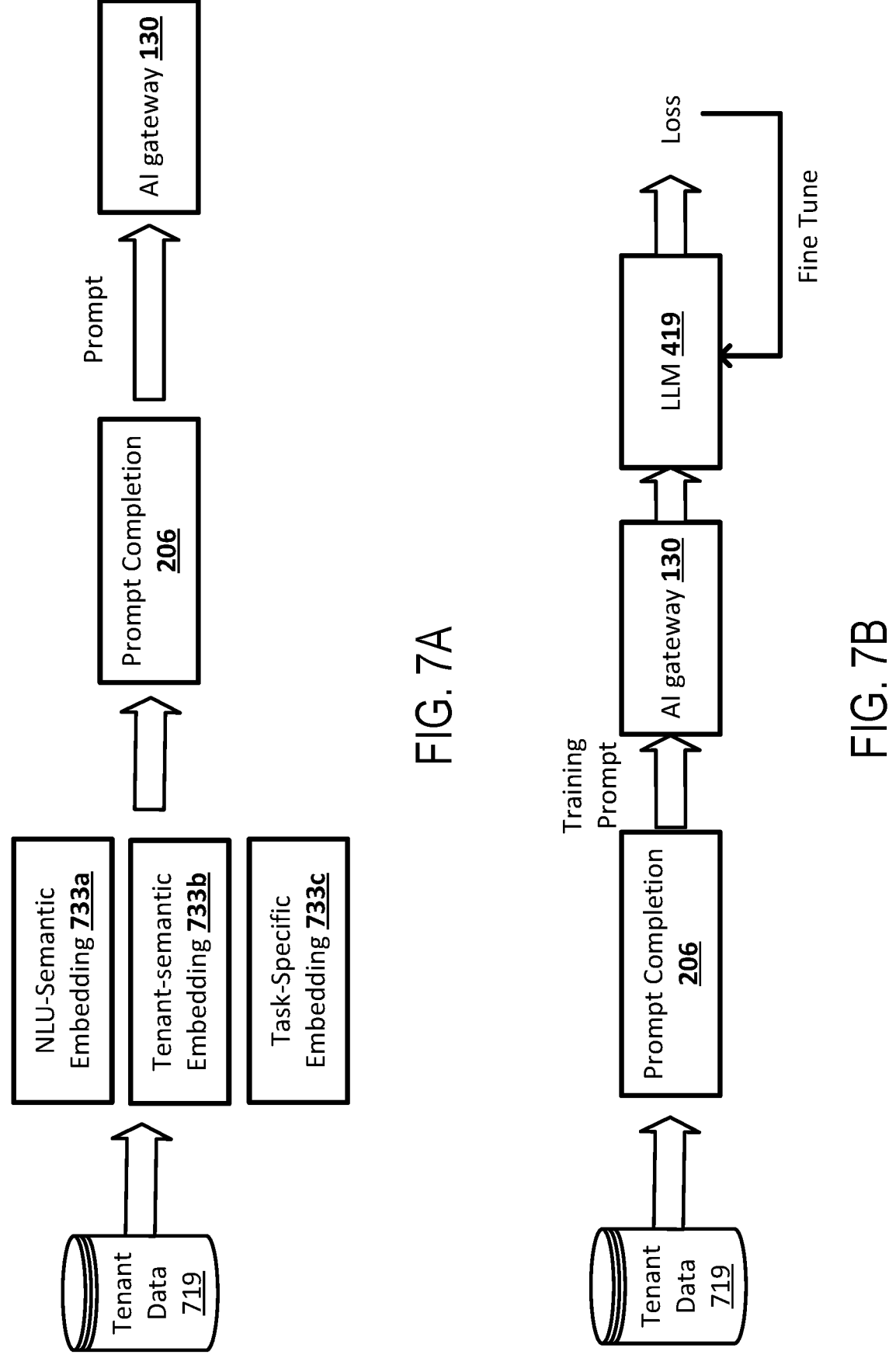
FIGS. 7A-7B are example diagrams illustrating example operations of domain adaptation shown in FIG. 1, according to embodiments described herein.

FIGS. 7A-7B are example diagrams illustrating example operations of domain adaptation 122 shown in FIG. 1, according to embodiments described herein. In one embodiment, domain adaptation 122 may facilitate an LLM to learn from and adapt to tenant data (such as enterprise user account data, and/or any proprietary data). For example, additional domain knowledge may be injected into the prompt (grounding) as shown in FIG. 7A, or into LLM 419 itself by finetuning the LLM 419 using domain data as shown in FIG. 7B.

As shown in FIG. 7A in one embodiment, tenant data 719 which may come from various sources may be readily available and/or obtained directly from one or more user applications, such as metadata linked to an open account object. In other cases, tenant data may be retrieved from one or more internal or external databases, such as through a SOQL query for a complete opportunity history.

In one embodiment, the generative AI platform (e.g., 110 in FIG. 1) may semantically retrieve content according to the input context (e.g., in the user input 105 in FIG. 1). For example, a task request (e.g., 203 in FIG. 3) may relate to a keyword search for a knowledge article that troubleshoots a customer issue that is described in the user input 105 in FIG. 1. The generative AI platform may perform, in addition to keyword search, a range of information retrieval, such as identifying a similar account to a given account, finding a successful follow-up email from a specific opportunity stage, locating a community discussion thread that follow a similar troubleshooting process, and/or the like.

The generative AI platform may provide a variety of retrieval strategies to retrieve previously stored content relating to the input context, e.g., sematic embeddings such as natura language understanding (NLU)-semantic embedding 733*a* in a general purpose natural language meaning space, tenant-specific embedding 733*b* in a tenant-specific meaning space oriented at tenant data, and/or task-specific embedding 733*c*. For example, the NLU-semantic embedding 733*a* may be retrieved from an LLM vendor's embedding endpoint, or other publicly available semantic embedding models and/or stores. For another example, in the tenant-semantic space, two user accounts may be similar if they are of a similar size, exist in the same industry, use a similar suite of products, have similar case histories, and/or have similar conversation histories with their account executives. In contrast, two accounts can be judged as similar in NLU-semantic space only if they have similar natural language descriptions. Therefore, tenant-semantic embeddings 733*b* may capture information and relationships between user accounts. For another example, task-specific embeddings 733*c* may comprise specialized embeddings obtained through supervised learning that encodes a task-specific notion of similarity. For instance, a reply recommendation (e.g., 510*a* in FIG. 5) may rely on task-specific embeddings 733*c* of chat segments and responses, in order to retrieve a template response that matches a given chat context.

In one embodiment, the embeddings 733*a-c* may be supported and stored at one or more of the stores 311-313 in FIG. 3. For example, one or more of the embeddings 733*a-c* may be generated by custom models 311 from model store.

In one embodiment, retrieved embeddings 733*a-c* may be injected by the prompt completion 206 into a prompt that is passed to the AI gateway 130. In this way, tenant data 719, such as organization-specific knowledge such as policies or facts found in an enterprise and/or organization knowledge base is injected into the prompt to guide an LLM to generate a domain-specific response.

As shown in FIG. 7B in one embodiment, tenant data 719 may be used to finetune one or more LLMs. For example, a copy of the LLM may be implemented at an enterprise server and thus may be tuned using tenant data 719. Such LLM tuning may be conducted through unsupervised model tuning or supervised model tuning.

For example, unsupervised model tuning may take a complete tenant dataset 719 as input for the prompt completion 206 to generate training prompts such that LLM 419 may be adjusted to result in a domain-specific LLM. The finetuned LLM may perform a wide range of NLP tasks with understanding of the specific vocabulary, topics, and overall semantics learnt from tenant data 719. This adaptation method is conceptually similar to incorporating domain data into the original LLM training.

For another example, supervised tuning may apply to situations in which tenant data 719 is labeled for a specific task. Supervised tuning may be used to predict a field value on a tenant object, or to update a deployed model based on explicit user feedback. The task adaptation process effectively results in a new, specialist LLM that is finetuned to perform a single task on a single tenant dataset 719. Additional discussion on training and/or finetuning a model according to a loss is provided in FIG. 9.

In one embodiment, for either supervised or unsupervised finetuning, some or all of the weights of the original LLM may be directly updated. In another embodiment, model distillation may be applied to produce a smaller, self-contained LLM that specializes in the desired task.

In one embodiment, without modifying and/or updating the LLM 419 itself, prompts, in the form of a collection of vectors, may be tuned and/or updated according to the loss. The tuned prompts may then be fed to the LLM 419, together with a new task request, to generate a response. In another embodiment, prompt tuning may entail searching and adopting a best-worded prompt using training data as feedback.

In some implementations, human users may review generated contents before sending to the end customers. Feedback is collected from the app front, and feed into the generative AI layers for reinforcement learning.

Figure 8:
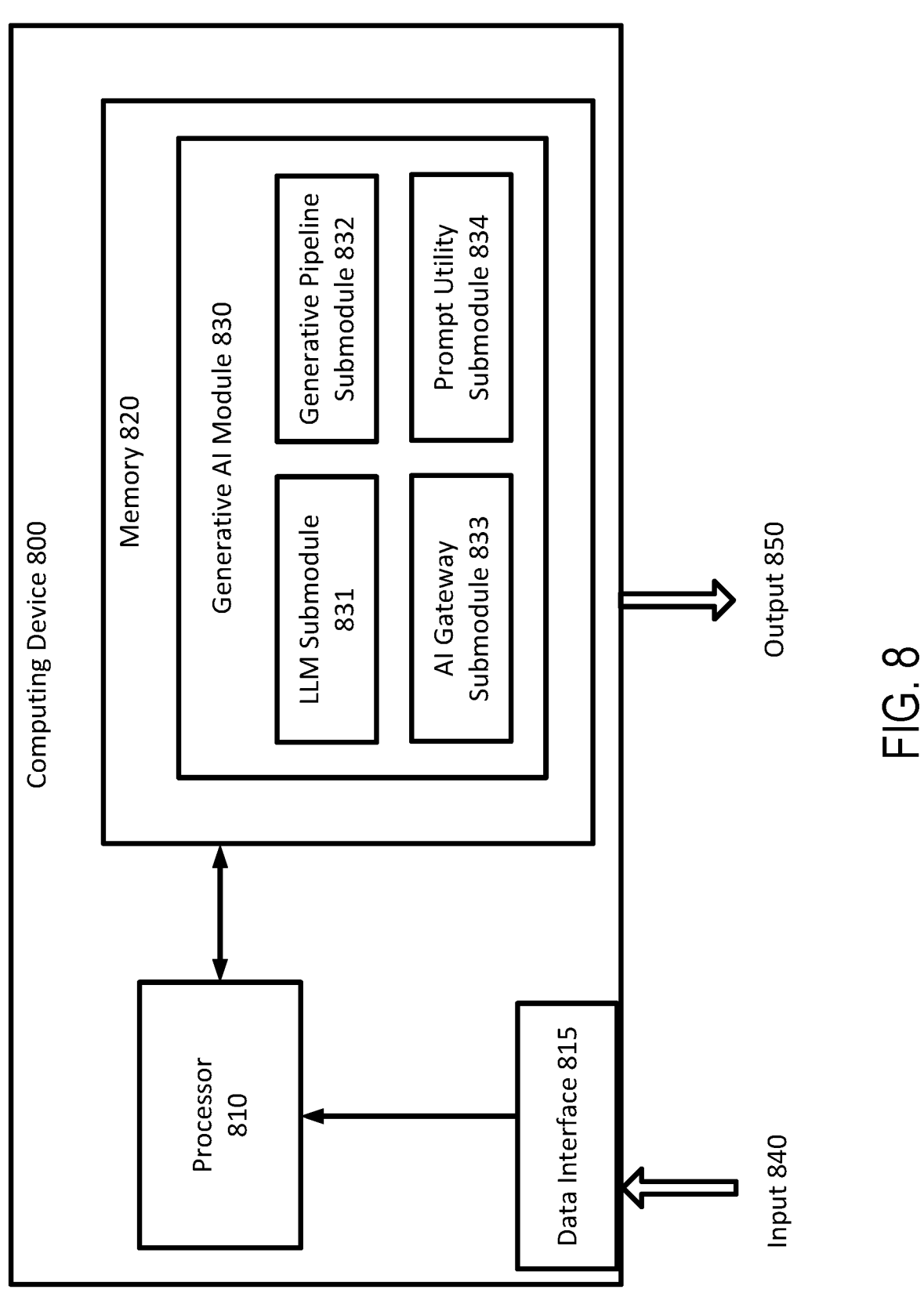
FIG. 8 is a simplified diagram illustrating a computing device implementing the generative AI framework described in FIG. 1, according to one embodiment described herein.

FIG. 8 is a simplified diagram illustrating a computing device implementing the generative AI framework described in FIG. 1, according to one embodiment described herein. As shown in FIG. 8, computing device 800 includes a processor 810 coupled to memory 820. Operation of computing device 800 is controlled by processor 810. And although computing device 800 is shown with only one processor 810, it is understood that processor 810 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 800. Computing device 800 may be implemented as a stand-alone subsystem, as a board added to a computing device, and/or as a virtual machine.

Memory 820 may be used to store software executed by computing device 800 and/or one or more data structures used during operation of computing device 800. Memory 820 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 810 and/or memory 820 may be arranged in any suitable physical arrangement. In some embodiments, processor 810 and/or memory 820 may be implemented on a same board, in a same package (e.g., system-in-package), on a same chip (e.g., system-on-chip), and/or the like. In some embodiments, processor 810 and/or memory 820 may include distributed, virtualized, and/or containerized computing resources. Consistent with such embodiments, processor 810 and/or memory 820 may be located in one or more data centers and/or cloud computing facilities.

In some examples, memory 820 may include non-transitory, tangible, machine readable media that includes executable code that when run by one or more processors (e.g., processor 810) may cause the one or more processors to perform the methods described in further detail herein. For example, as shown, memory 820 includes instructions for generative AI module 830 that may be used to implement and/or emulate the systems and models, and/or to implement any of the methods described further herein. generative AI module 830 may receive input 840 such as an input training data (e.g., tenant data for one or more customers) via the data interface 815 and generate an output 850 which may be a response for a generative AI chat platform. Examples of the input data may include a user utterance on a chat platform. Examples of the output data may include system generated responses based on tenant data.

The data interface 815 may comprise a communication interface, a user interface (such as a voice input interface, a graphical user interface, and/or the like). For example, the computing device 800 may receive the input 840 (such as a training dataset) from a networked database via a communication interface. Or the computing device 800 may receive the input 840, such as customer utterances, from a user via the user interface.

In some embodiments, the generative AI module 830 is configured to build a customized AI chat platform infused with tenant data as described herein and in. The generative AI module 830 may further include a LLM submodule 831 pretrained to provide foundational services such as NLP functionalities, a generative pipeline submodule 832 (e.g., similar to 115 in FIG. 1), an AI gateway submodule 833 (e.g., similar to 130 in FIG. 1) that is used to interface with external LLMs, a prompt utility submodule 834 (e.g., similar to 123 in FIG. 1). In one embodiment, the generative AI module 830 and its submodules 831-1034 may be implemented by hardware, software and/or a combination thereof.

Some examples of computing devices, such as computing device 800 may include non-transitory, tangible, machine readable media that include executable code that when run by one or more processors (e.g., processor 810) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 9:
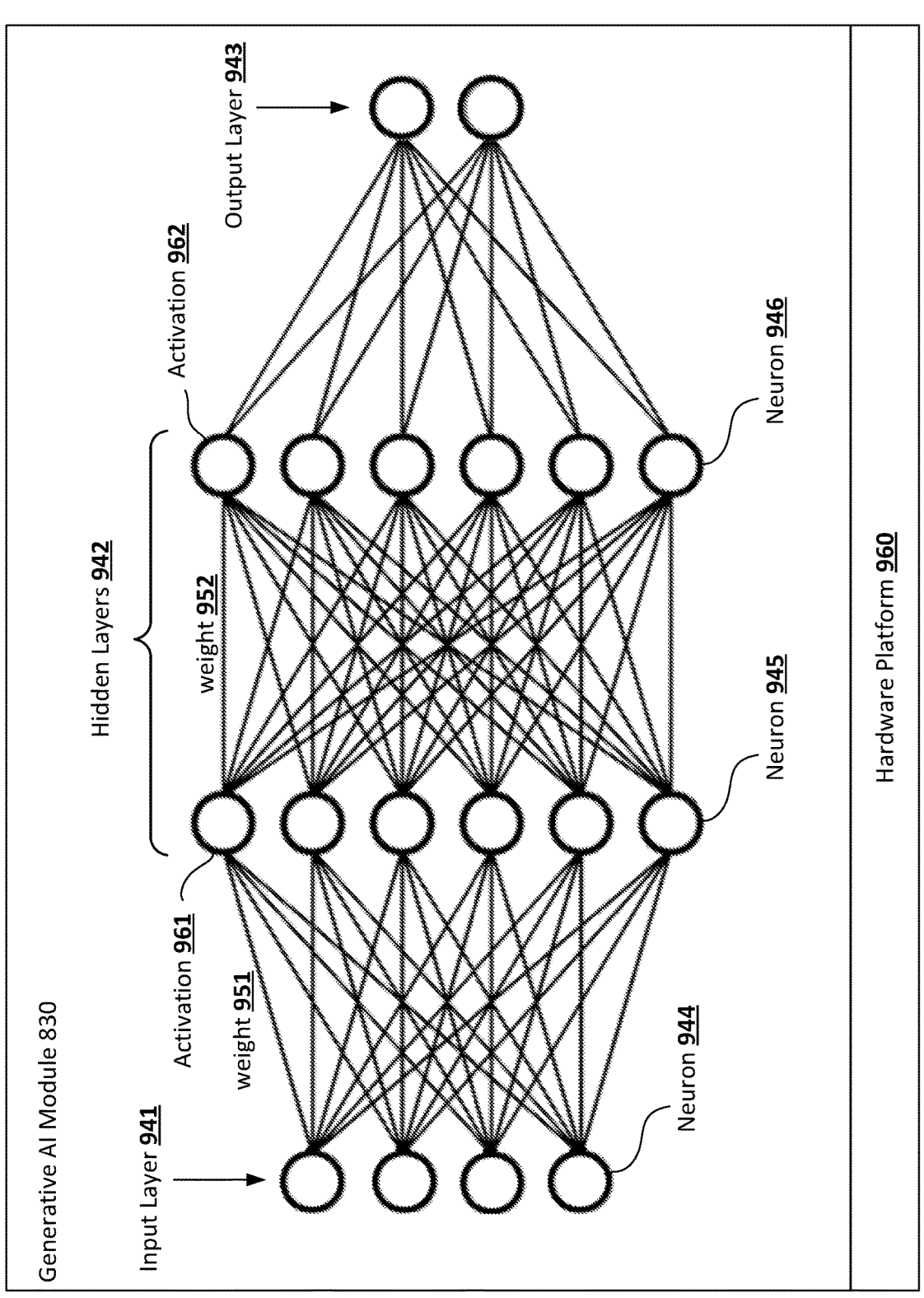
FIG. 9 is a simplified diagram illustrating the neural network structure implementing the generative AI module described in FIG. 8, according to some embodiments.

FIG. 9 is a simplified diagram illustrating the neural network structure implementing the generative AI module 830 described in FIG. 8, according to some embodiments. In some embodiments, the generative AI module 830 and/or one or more of its submodules 831-834 may be implemented at least partially via an artificial neural network structure shown in FIG. 9. The neural network comprises a computing system that is built on a collection of connected units or nodes, referred to as neurons (e.g., 944, 945, 946). Neurons are often connected by edges, and an adjustable weight (e.g., 951, 952) is often associated with the edge. The neurons are often aggregated into layers such that different layers may perform different transformations on the respective input and output transformed input data onto the next layer.

For example, the neural network architecture may comprise an input layer 941, one or more hidden layers 942 and an output layer 943. Each layer may comprise a plurality of neurons, and neurons between layers are interconnected according to a specific topology of the neural network topology. The input layer 941 receives the input data (e.g., 840 in FIG. 8), such as a training data set of prior user agent conversations. The number of nodes (neurons) in the input layer 941 may be determined by the dimensionality of the input data (e.g., the length of a vector of a user utterance). Each node in the input layer represents a feature or attribute of the input.

The hidden layers 942 are intermediate layers between the input and output layers of a neural network. It is noted that two hidden layers 942 are shown in FIG. 9B for illustrative purpose only, and any number of hidden layers may be utilized in a neural network structure. Hidden layers 942 may extract and transform the input data through a series of weighted computations and activation functions.

For example, as discussed in FIG. 8, the generative AI module 830 receives an input 940 of a user utterance and transforms the input into an output 950 of an agent response. To perform the transformation, each neuron receives input signals, performs a weighted sum of the inputs according to weights assigned to each connection (e.g., 951, 952), and then applies an activation function (e.g., 961, 962, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 941 is transformed into rather different values indicative data characteristics corresponding to a task that the neural network structure has been designed to perform.

The output layer 943 is the final layer of the neural network structure. It produces the network's output or prediction based on the computations performed in the preceding layers (e.g., 941, 942). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the generative AI module 830 and/or one or more of its submodules 831-234 may comprise the transformative neural network structure of layers of neurons, and weights and activation functions describing the non-linear transformation at each neuron. Such a neural network structure is often implemented on one or more hardware processors 910, such as a graphics processing unit (GPU). An example neural network may be a large language model, and/or the like.

In one embodiment, the generative AI module 830 and its submodules 831-834 may be implemented by hardware, software and/or a combination thereof. For example, the generative AI module 830 and its submodules 831-834 may comprise a specific neural network structure implemented and run on various hardware platforms 960, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 960 used to implement the neural network structure is specifically configured based on factors such as the complexity of the neural network, the scale of the tasks (e.g., training time, input data scale, size of training dataset, etc.), and the desired performance.

In one embodiment, the neural network based generative AI module 830 and one or more of its submodules 831-834 may be trained by iteratively updating the underlying parameters (e.g., weights 951, 952, etc., bias parameters and/or coefficients in the activation functions 961, 962 associated with neurons) of the neural network based on the loss. For example, during forward propagation, the training data such as prior user-agent dialogue pairs are fed into the neural network. The data flows through the network's layers 941, 942, with each layer performing computations based on its weights, biases, and activation functions until the output layer 943 produces the network's output 950. In some embodiments, output layer 943 produces an intermediate output on which the network's output 950 is based.

The output generated by the output layer 943 is compared to the expected output (e.g., a "ground-truth" such as the corresponding agent response from a dialogue) from the training data, to compute a loss function that measures the discrepancy between the predicted output and the expected output. For example, the loss function may be cross entropy, MMSE, and/or the like. Given the loss, the negative gradient of the loss function is computed with respect to each weight of each layer individually. Such negative gradient is computed one layer at a time, iteratively backward from the last layer 943 to the input layer 941 of the neural network. These gradients quantify the sensitivity of the network's output to changes in the parameters. The chain rule of calculus is applied to efficiently calculate these gradients by propagating the gradients backward from the output layer 943 to the input layer 941.

Parameters of the neural network are updated backwardly from the last layer to the input layer (backpropagating) based on the computed negative gradient using an optimization algorithm to minimize the loss. The backpropagation from the last layer 943 to the input layer 941 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as reply recommendation, email automation, and/or the like.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in natural language generation in an enterprise environment.

Figure 10:
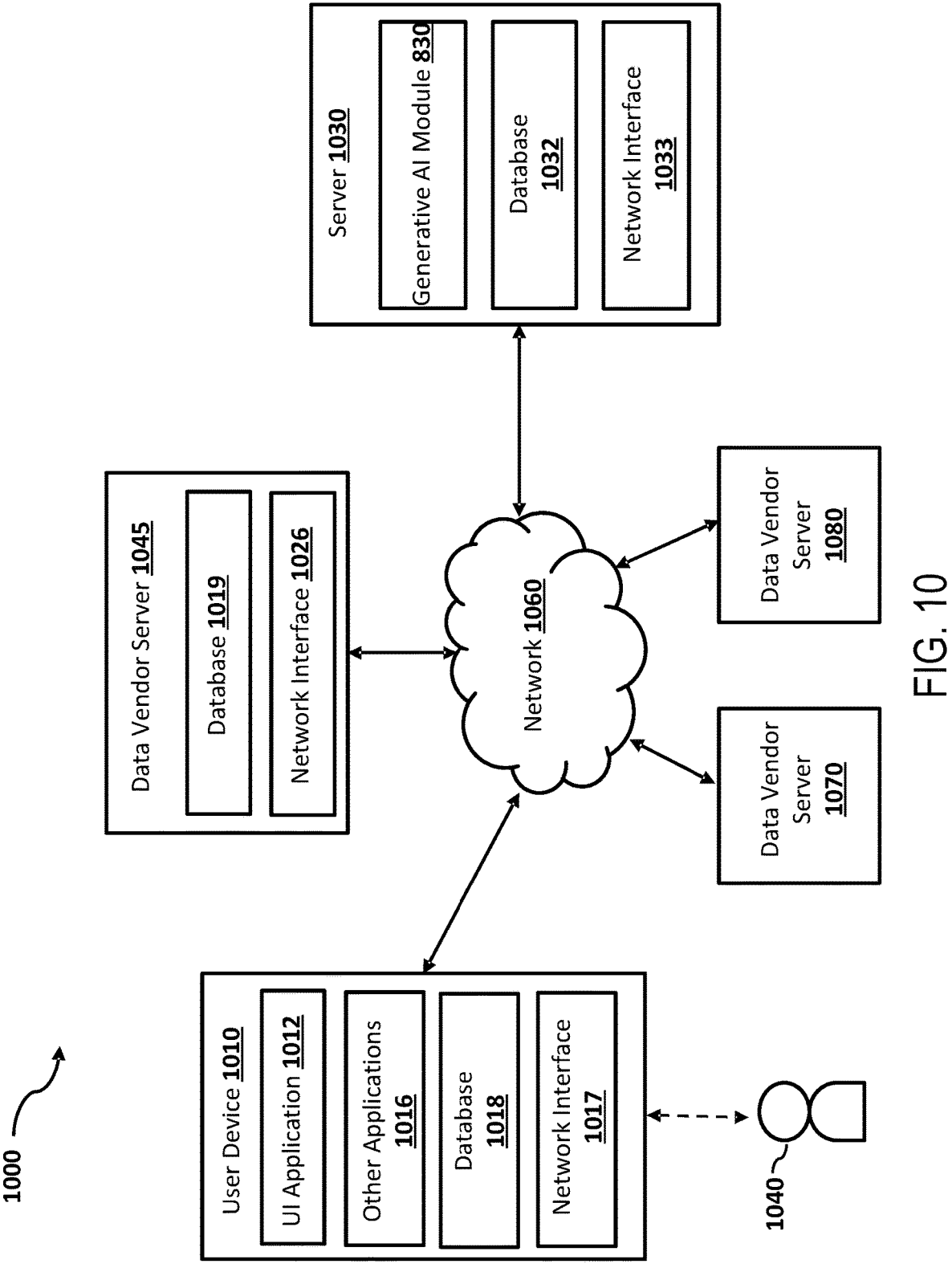
FIG. 10 is a simplified block diagram of a networked system suitable for implementing the generative AI framework described in FIGS. 1-9 and other embodiments described herein.

FIG. 10 is a simplified block diagram of a networked system 1000 suitable for implementing the generative AI framework described in FIGS. 1-9 and other embodiments described herein. In one embodiment, system 1000 includes the user device 1010 which may be operated by user 1040, data vendor servers 1045, 1070 and 1080, server 1030, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 10 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 1010, data vendor servers 1045, 1070 and 1080, and the server 1030 may communicate with each other over a network 1060. User device 1010 may be utilized by a user 1040 (e.g., a driver, a system admin, etc.) to access the various features available for user device 1010, which may include processes and/or applications associated with the server 1030 to receive an output data anomaly report.

User device 1010, data vendor server 1045, and the server 1030 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 1000, and/or accessible over network 1060.

User device 1010 may be implemented as a communication device that may utilize appropriate hardware and software configured for wired and/or wireless communication with data vendor server 1045 and/or the server 1030. For example, in one embodiment, user device 1010 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 1010 of FIG. 10 contains a user interface (UI) application 1012, and/or other applications 1016, which may correspond to executable processes, procedures, and/or applications with associated hardware. For example, the user device 1010 may receive a message indicating a system response from a customized generative AI chat platform from the server 1030 and display the message via the UI application 1012. In other embodiments, user device 1010 may include additional or different modules having specialized hardware and/or software as required.

In one embodiment, UI application 1012 may support and/or communicatively operate with the user applications 102 to provide a user interface such as a interactive chat session, an email interface, and/or the like with a user.

In various embodiments, user device 1010 includes other applications 1016 as may be desired in particular embodiments to provide features to user device 1010. For example, other applications 1016 may include security applications for implementing client-side security features, programmatic client applications for interfacing with appropriate application programming interfaces (APIs) over network 1060, or other types of applications. Other applications 1016 may also include communication applications, such as email, texting, voice, social networking, and IM applications that allow a user to send and receive emails, calls, texts, and other notifications through network 1060. For example, the other application 1016 may be an email or instant messaging application that receives a prediction result message from the server 1030. Other applications 1016 may include device interfaces and other display modules that may receive input and/or output information. For example, other applications 1016 may contain software programs for asset management, executable by a processor, including a graphical user interface (GUI) configured to provide an interface to the user 1040 to view a system response.

User device 1010 may further include database 1018 stored in a transitory and/or non-transitory memory of user device 1010, which may store various applications and data and be utilized during execution of various modules of user device 1010. Database 1018 may store user profile relating to the user 1040, predictions previously viewed or saved by the user 1040, historical data received from the server 1030, and/or the like. In some embodiments, database 1018 may be local to user device 1010. However, in other embodiments, database 1018 may be external to user device 1010 and accessible by user device 1010, including cloud storage systems and/or databases that are accessible over network 1060.

User device 1010 includes at least one network interface component 1017 adapted to communicate with data vendor server 1045 and/or the server 1030. In various embodiments, network interface component 1017 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 1045 may correspond to a server that hosts database 1019 to provide training datasets including tenant data to the server 1030. The database 1019 may be implemented by one or more relational database, distributed databases, cloud databases, and/or the like.

The data vendor server 1045 includes at least one network interface component 1026 adapted to communicate with user device 1010 and/or the server 1030. In various embodiments, network interface component 1026 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 1045 may send asset information from the database 1019, via the network interface 1026, to the server 1030.

The server 1030 may be housed with the generative AI module 830 and its submodules described in FIG. 8. In some implementations, generative AI module 830 may receive data from database 1019 at the data vendor server 1045 via the network 1060 to generate a system response. The generated system response may also be sent to the user device 1010 for review by the user 1040 via the network 1060.

The database 1032 may be stored in a transitory and/or non-transitory memory of the server 1030. In one implementation, the database 1032 may store data obtained from the data vendor server 1045. In one implementation, the database 1032 may store parameters of the generative AI module 830. In one implementation, the database 1032 may store previously generated system responses, and the corresponding input feature vectors.

In some embodiments, database 1032 may be local to the server 1030. However, in other embodiments, database 1032 may be external to the server 1030 and accessible by the server 1030, including cloud storage systems and/or databases that are accessible over network 1060.

The server 1030 includes at least one network interface component 1033 adapted to communicate with user device 1010 and/or data vendor servers 1045, 1070 or 1080 over network 1060. In various embodiments, network interface component 1033 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 1060 may be implemented as a single network or a combination of multiple networks. For example, in various embodiments, network 1060 may include the Internet or one or more intranets, landline networks, wireless networks, and/or other appropriate types of networks. Thus, network 1060 may correspond to small scale communication networks, such as a private or local area network, or a larger scale network, such as a wide area network or the Internet, accessible by the various components of system 1000.

Example Work Flows

FIG. 11 is an example logic flow diagram illustrating a method of building a customized generative artificial intelligence (AI) infrastructure at an enterprise server shown in FIGS. 1-10, according to some embodiments described herein. One or more of the processes of method 1100 may be implemented, at least in part, in the form of executable code stored on non-transitory, tangible, machine-readable media that when run by one or more processors may cause the one or more processors to perform one or more of the processes. In some embodiments, method 1100 corresponds to the operation of the generative AI module 830 (e.g., FIGS. 8 and 10) that builds and operates a customized generative AI infrastructure at an enterprise server.

As illustrated, the method 1100 includes a number of enumerated steps, but aspects of the method 1100 may include additional steps before, after, and in between the enumerated steps. In some aspects, one or more of the enumerated steps may be omitted or performed in a different order.

At step 1102, a natural language processing (NLP) task request comprising a user input (e.g., 105 in FIG. 1) may be received via a communication interface (e.g., 815 in FIG. 8) from a user application (e.g., 102 in FIG. 1).

At step 1104, a database of user-specified prompt templates (e.g., prompt store 211 in FIG. 2) may be searched based on the NLP task.

At step 1106, one or more context vectors may be retrieved, from a database of context features (e.g., vector store 312, feature store 313, etc. of FIG. 3), based on the NLP task request. In one implementation, the one or more context vectors may be used to inject knowledge from a domain. For example, domain training data (e.g., 719 in FIG. 7A) may be transformed into one or more semantic vectors and/or task-specific vectors, and then injected the one or more semantic vectors and/or task-specific vectors (e.g., 733*a-c* in FIG. 7A), which are then injected into the one or more generated prompts.

At step 1108, one or more user-specified prompt templates may be populated with the retrieved one or more context vectors (e.g., by the prompt completion 206 in FIG. 3). In one implementation, the one or more generated prompts may be augmented with a set of constraints that are specific to the NLP task, wherein the set of constraints are provided by a user via a user interface.

At step 1110, an AI gateway (e.g., 130 in FIG. 1) may transmit one or more generated prompts to a neural network based NLP model (e.g., LLMs 519*a-n* in FIG. 5) that is housed at a vendor server external to the enterprise server. For example, the neural network NLP model may be selected for the customized generative AI infrastructure based on the NLP task. The one or more generated prompts may be incorporated into a normalized API request (e.g., 513 in FIG. 5) comprising a parameter specifying a specific vendor and/or the selected specific neural network based NLP model.

At step 1112, the AI gateway may receive a NLP response from the NLP model.

At step 1114, a user interface of the user application (e.g., 102 in FIGS. 1 and 5) may generate a formatted output specific to the user application based on the NLP response in response to the user input. For example, the customized generative AI infrastructure (e.g., 100 in FIG. 1) may comprises a user-interactive chatbot user interface application that interactively receives one or more user utterances, and presents one or more responses generated by a neural network based NLP model through a secure connection.

FIG. 12 is an example logic flow diagram illustrating a method of operating an AI gateway to connect to vendor-specific LLMs shown in FIGS. 1-10, according to some embodiments described herein. One or more of the processes of method 1200 may be implemented, at least in part, in the form of executable code stored on non-transitory, tangible, machine-readable media that when run by one or more processors may cause the one or more processors to perform one or more of the processes. In some embodiments, method 1200 corresponds to the operation of the generative AI module 830 (e.g., FIGS. 8 and 10) that builds and operates a customized generative AI infrastructure at an enterprise server.

As illustrated, the method 1200 includes a number of enumerated steps, but aspects of the method 1200 may include additional steps before, after, and in between the enumerated steps. In some aspects, one or more of the enumerated steps may be omitted or performed in a different order.

At step 1202, a natural language processing (NLP) task request comprising a user input (e.g., 105 in FIG. 1) may be received via a communication interface (e.g., 815 in FIG. 8) from a user application (e.g., 102 in FIG. 1).

At step 1204, one or more prompts may be generated based on the NLP task request. For example, the one or more prompts may be generated according to steps 1104-1108 in FIG. 11.

At step 1206, a data gateway (e.g., 130 in FIGS. 1 and 5) may transform the one or more prompts into a normalized API request, e.g., by incorporating the one or more prompts into a payload of the normalized API request. The data gateway takes a form of a web application. For example, the normalized API request comprises a parameter specifying a specific vendor and/or a specific neural network based NLP model.

At step 1208, the data gateway may transmit the normalized API request to an external vendor server hosting one or more neural network based NLP models (e.g., 519*a-n* in FIG. 5). The data gateway may further transmit to the external vendor server, a request to return a list of neural network based NLP models.

In one implementation, at step 1210, the normalized API request is translated to a vendor-specific request for generating a vendor-specific response by the one or more neural network based NLP models. At step 1212, the vendor-specific response is translated to a normalized API response.

At step 1214, the data gateway may receive the normalized response from the external vendor server.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of building a customized generative artificial intelligence (AI) infrastructure at an enterprise server, the method comprising:

receiving, via a communication interface, a natural language processing (NLP) task request comprising a user input from a user application;

searching a database of user-specified prompt templates based on the NLP task;

retrieving, from a database of context features, one or more context vectors based on the NLP task request;

populating one or more user-specified prompt templates with the retrieved one or more context vectors;

transforming, by a data gateway, one or more generated prompts into a normalized API request comprising a parameter specifying a specific vendor and/or a specific neural network based NLP model;

selecting the specific neural network NLP model for the customized generative AI infrastructure based on the NLP task;

transmitting, via an AI gateway, the one or more generated prompts to the specific neural network based NLP model that is housed at a vendor server external to the enterprise server;

receiving, via the AI gateway, a NLP response from the specific neural network based NLP model; and generating, via a user interface of the user application, a formatted output specific to the user application based on the NLP response in response to the user input.

2. The method of claim 1, further comprising:

transforming domain training data into one or more semantic vectors and/or task-specific vectors; and injecting the one or more semantic vectors and/or task-specific vectors into the one or more generated prompts.

3. The method of claim 1, further comprising:

transforming domain training data into training prompts;

storing an adapted training dataset comprising the one or more training prompts;

transmitting, through the AI gateway to the specific neural network based NLP model, the at least one training prompts thereby finetuning the specific neural network based NLP model.

4. The method of claim 1, wherein the customized generative AI infrastructure comprises a user-interactive chatbot user interface application that interactively receives one or more user utterances, and presents one or more responses generated by the specific neural network based NLP model through a secure connection.

5. The method of claim 1, further comprising:

augmenting the one or more generated prompts with a set of constraints that are specific to the NLP task, wherein the set of constraints are provided by a user via a user interface.

6. A system for building a customized generative artificial intelligence (AI) infrastructure at an enterprise server, the system comprising:

a memory that stores a plurality of processor executable instructions;

a communication interface that receives a natural language processing (NLP) task request comprising a user input from a user application; and one or more hardware processors that read and execute the plurality of processor-executable instructions from the memory to perform operations comprising:

searching a database of user-specified prompt templates based on the NLP task;

retrieving, from a database of context features, one or more context vectors based on the NLP task request;

populating one or more user-specified prompt templates with the retrieved one or more context vectors;

transforming, by a data gateway, one or more generated prompts into a normalized API request comprising a parameter specifying a specific vendor and/or a specific neural network based NLP model;

selecting the specific neural network NLP model for the customized generative AI infrastructure based on the NLP task;

transmitting, via an AI gateway, the one or more generated prompts to the specific neural network based NLP model that is housed at a vendor server external to the enterprise server;

receiving, via the AI gateway, a NLP response from the specific neural network based NLP model; and generating, via a user interface of the user application, a formatted output specific to the user application based on the NLP response in response to the user input.

7. The system of claim 6, wherein the operations further comprise:

transforming domain training data into one or more semantic vectors and/or task-specific vectors; and injecting the one or more semantic vectors and/or task-specific vectors into the one or more generated prompts.

8. The system of claim 6, wherein the operations further comprise:

transforming domain training data into training prompts;

storing an adapted training dataset comprising the one or more training prompts;

transmitting, through the AI gateway to the specific neural network based NLP model, the at least one training prompts thereby finetuning the specific neural network based NLP model.

9. The system of claim 6, wherein the customized generative AI infrastructure comprises a user-interactive chatbot user interface application that interactively receives one or more user utterances, and presents one or more responses generated by the specific neural network based NLP model through a secure connection.

10. The system of claim 6, wherein the operations further comprise:

augmenting the one or more generated prompts with a set of constraints that are specific to the NLP task, wherein the set of constraints are provided by a user via a user interface.

11. A non-transitory machine-readable medium comprising a plurality of machine-executable instructions for building a customized generative artificial intelligence (AI) infrastructure at an enterprise server, which, when executed by one or more processors, are adapted to cause the one or more processors to perform operations comprising:

receiving, via a communication interface, a natural language processing (NLP) task request comprising a user input from a user application;

searching a database of user-specified prompt templates based on the NLP task;

retrieving, from a database of context features, one or more context vectors based on the NLP task request;

populating one or more user-specified prompt templates with the retrieved one or more context vectors;

transforming, by a data gateway, one or more generated prompts into a normalized API request comprising a parameter specifying a specific vendor and/or a specific neural network based NLP model;

selecting the specific neural network NLP model for the customized generative AI infrastructure based on the NLP task;

transmitting, via an AI gateway, the one or more generated prompts to the specific neural network based NLP model that is housed at a vendor server external to the enterprise server;

receiving, via the AI gateway, a NLP response from the specific NLP model; and generating, via a user interface of the user application, a formatted output specific to the user application based on the NLP response in response to the user input.

12. The medium of claim 11, wherein the operations further comprise:

transforming domain training data into one or more semantic vectors and/or task-specific vectors; and injecting the one or more semantic vectors and/or task-specific vectors into the one or more generated prompts.

13. The medium of claim 11, wherein the operations further comprise:

transforming domain training data into training prompts;

storing an adapted training dataset comprising the one or more training prompts; and transmitting, through the AI gateway to the specific neural network based NLP model, the at least one training prompts thereby finetuning the specific neural network based NLP model.

14. The medium of claim 11, wherein the customized generative AI infrastructure comprises a user-interactive chatbot user interface application that interactively receives one or more user utterances, and presents one or more responses generated by the specific neural network based NLP model through a secure connection.

15. The medium of claim 11, wherein the operations further comprise:

augmenting the one or more generated prompts with a set of constraints that are specific to the NLP task, wherein the set of constraints are provided by a user via a user interface.

* * * * *